United States Patent
Koo et al.

(10) Patent No.: US 6,245,234 B1
(45) Date of Patent: *Jun. 12, 2001

(54) COMPOSITE POLYAMIDE REVERSE OSMOSIS MEMBRANE AND METHOD OF PRODUCING THE SAME

(75) Inventors: Ja-Young Koo, Acton, MA (US); Jong-Eun Kim, Jeju-si (KR); Wan-Ju Kim, Taejun (KR); Ki Suop Park, Suwon (KR)

(73) Assignee: Saehan Industries Incorporation (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/325,303

(22) Filed: Jun. 3, 1999

(51) Int. Cl.⁷ .......................... B01D 79/56; B01D 39/14
(52) U.S. Cl. ............. 210/500.38; 210/490; 210/500.27; 264/41; 427/244; 427/245
(58) Field of Search .................. 210/500.27, 490, 210/500.38, 500.37, 500.42; 264/41; 427/244, 245

(56) References Cited

U.S. PATENT DOCUMENTS

| | | | |
|---|---|---|---|
| 3,817,386 | * | 6/1974 | Frost et al. ............... 210/490 |
| 3,904,519 | * | 9/1975 | McKinney, Jr. et al. ........ 210/490 |
| 4,277,344 | * | 7/1981 | Cadotte ................. 210/654 |
| 4,340,480 | | 7/1982 | Pall et al. . |
| 4,761,234 | * | 8/1988 | Vemura et al. ............. 210/500.38 |
| 4,769,148 | * | 9/1988 | Fibiger et al. ............. 210/500.38 |
| 4,778,596 | * | 10/1988 | Linder et al. .............. 210/638 |
| 4,830,885 | | 5/1989 | Tran et al. . |
| 4,859,384 | * | 8/1989 | Fibiger et al. ............ 264/148 |
| 4,872,984 | | 10/1989 | Tomaschke . |
| 4,950,404 | * | 8/1990 | Chau ................. 210/500.27 |
| 4,980,067 | | 12/1990 | Hou et al. . |
| 4,983,291 | | 1/1991 | Chau et al. . |
| 5,576,057 | | 11/1996 | Hirose et al. . |
| 5,614,099 | | 3/1997 | Hirose et al. . |
| 5,693,227 | | 12/1997 | Costa . |
| 5,746,917 | | 5/1998 | Altmeier . |
| 5,843,351 | | 12/1998 | Hirose et al. . |
| 5,922,203 | * | 7/1999 | Tomaschke ............ 210/500.37 |

* cited by examiner

*Primary Examiner*—Ana Fortuna
(74) *Attorney, Agent, or Firm*—Kriegsman & Kriegsman

(57) ABSTRACT

A composite polyamide reverse osmosis membrane and method of producing same. In one embodiment, the membrane is made by coating a porous polysulfone support for about 40 seconds with an aqueous solution containing (i) a polyfunctional primary or secondary amine in the form of 1.6 wt. % of meta-phenylenediamine (MPD), (ii) a polyfunctional tertiary amine in the form of 0.4 wt. % N,N,N',N'-tetramethyl-1,6-hexanediamine (TMHD), and (iii) a polar solvent in the form of 0.2 wt. % 2-ethyl-1,3-hexanediol (EHD). Next, the excess aqueous solution is removed, and the coated support is dipped for about 1 minute in a 0.1 wt. % organic solvent solution of trimesoyl chloride (TMC) in a mixture of alkanes having from 8 to 12 carbon atoms. After draining the organic solvent solution off, the resulting composite membrane is air dried at room temperature for about 1 minute and then rinsed in a 0.2% $Na_2CO_3$ aqueous solution for 30 minutes at room temperature. The resultant membrane exhibits a flux of 46.5 gfd and a salt rejection of 97.1% when used at 225 psi for an aqueous solution containing 2000 ppm of NaCl. In another embodiment, instead of including a polyfunctional tertiary amine in the aqueous solution, there is included the reaction product of a polyfunctional tertiary amine and a strong acid, preferably in a ratio ranging from greater than 1:0, respectively, to less than or equal to 1:(0.95)n, respectively, where n is the number of tertiary functional groups in the polyfunctional tertiary amine.

60 Claims, No Drawings

COMPOSITE POLYAMIDE REVERSE OSMOSIS MEMBRANE AND METHOD OF PRODUCING THE SAME

BACKGROUND OF THE INVENTION

The present invention relates generally to reverse osmosis membranes and more particularly to a novel composite polyamide reverse osmosis membrane and to a method of producing the same.

It is known that dissolved substances can be separated from their solvents by the use of various types of selective membranes, examples of such membranes including microfiltration membranes, ultrafiltration membranes and reverse osmosis membranes. One use to which reverse osmosis membranes have previously been put is in the desalination of brackish water or seawater to provide large volumes of relatively non-salty water suitable for industrial, agricultural or home use. What is involved in the desalination of brackish water or seawater using reverse osmosis membranes is literally a filtering out of salts and other dissolved ions or molecules from the salty water by forcing the salty water through a reverse osmosis membrane whereby purified water passes through the membrane while salts and other dissolved ions and molecules do not pass through the membrane. Osmotic pressure works against the reverse osmosis process, and the more concentrated the feed water, the greater the osmotic pressure which must be overcome.

A reverse osmosis membrane, in order to be commercially useful in desalinating brackish water or seawater on a large scale, must possess certain properties. One such property is that the membrane have a high salt rejection coefficient. In fact, for the desalinated water to be suitable for many commercial applications, the reverse osmosis membrane should have a salt rejection capability of at least about 97%. Another important property of a reverse osmosis membrane is that the membrane possess a high flux characteristic, i.e., the ability to pass a relatively large amount of water through the membrane at relatively low pressures. Typically, the flux for the membrane should be greater than 10 gallons/ft$^2$-day (gfd) at a pressure of 800 psi for seawater and should be greater than 15 gfd at a pressure of 220 psi for brackish water. More preferably, the flux for the membrane is at least about 22 gfd at brackish water conditions. For certain applications, a rejection rate that is less than that which would otherwise be desirable may be acceptable in exchange for higher flux and vice versa.

One common type of reverse osmosis membrane is a composite membrane comprising a porous support and a thin polyamide film formed on the porous support. Typically, the polyamide film is formed by an interfacial polymerization of a polyfunctional amine and a polyfunctional acyl halide.

An example of the aforementioned composite reverse osmosis membrane is disclosed in U.S. Pat. No. 4,277,344, inventor Cadotte, which issued Jul. 7, 1981, and which is incorporated herein by reference. The aforementioned patent describes an aromatic polyamide film which is the interfacial reaction product of an aromatic polyamine having at least two primary amines substituents with an aromatic acyl halide having at least three acyl halide substituents. In the preferred embodiment, a porous polysulfone support is coated with m-phenylenediamine in water. After removal of excess m-phenylenediamine solution from the coated support, the coated support is covered with a solution of trimesoyl chloride dissolved in "FREON" TF solvent (trichlorotrifluoroethane). The contact time for the interfacial reaction is 10 seconds, and the reaction is substantially complete in 1 second. The resulting polysulfone/polyamide composite is then air-dried.

Although the Cadotte membrane described above exhibits good flux and good salt rejection, various approaches have been taken to further improve the flux and salt rejection of composite polyamide reverse osmosis membranes. In addition, other approaches have been taken to improve the resistance of said membranes to chemical degradation and the like. Many of these approaches have involved the use of various types of additives to the solutions used in the interfacial polycondensation reaction.

For example, in U.S. Pat. No. 4,872,984, inventor Tomaschke, which issued Oct. 10, 1989, and which is incorporated herein by reference, there is disclosed an aromatic polyamide membrane formed by (a) coating a microporous support with an aqueous solution comprising (i) an essentially monomeric, aromatic, polyamine reactant having at least two amine functional groups and (ii) an amine salt to form a liquid layer on the microporous support, (b) contacting the liquid layer with an organic solvent solution of an essentially monomeric, aromatic, amine-reactive reactant comprising a polyfunctional acyl halide or mixture thereof, wherein the amine-reactive reactant has, on the average, at least about 2.2 acyl halide groups per reactant molecule, and (c) drying the product of step (b), generally in an oven at about 60° C. to 110° C. for about 1 to 10 minutes, so as to form a water permeable membrane.

The amine salt of Tomaschke is a monofunctional, monomeric (i.e., polymerizable) amine. Preferably, said amine salt is a water soluble salt of a strong acid and a tertiary amine selected from the group consisting of a trialkylamine, such as trimethylamine, triethylamine, tripropylamine; an N-alkylcycloaliphatic amine, such as 1-methylpiperidine; an N,N-dialkylamine, such as N,N-dimethylethylamine and N,N-diethylmethylamine; an N,N-dialkyl ethanolamine, such as N,N-dimethylethanolamine; a bicyclic tertiary amine, such as 3-quinuclidinol; and mixtures thereof, or is a quaternary amine selected from at least one member of the group consisting of a tetraalkylammonium hydroxide, such as tetramethylammonium hydroxide, tetraethylammonium hydroxide and tetrapropylammonium hydroxide; a benzyl-trialkylammonium hydroxide, such as benzyltrimethylammonium hydroxide, benzyltriethylammonium hydroxide and benzyltripropylammonium hydroxide; and mixtures thereof.

In U.S. Pat. No. 4,983,291, inventors Chau et al., which issued Jan. 8, 1991, and which is incorporated herein by reference, there is disclosed a membrane which comprises a polymerized reaction product within and/or on a porous support backing material. According to the Chau et al. patent, said membrane may be prepared by contacting a porous support with an aqueous solution of a polyamine which may, if so desired, contain a polar aprotic solvent not reactive with the amines, a polyhydric compound and an acid acceptor. The polyhydric compound, which may include ethylene glycol, propylene glycol, glycerin and other longer carbon atom backbone glycols, may be present in the aqueous solution in an amount ranging from about 0.1 to about 50%. Examples of acid acceptors include sodium hydroxide, potassium hydroxide, sodium carbonate, triethylamine and N,N'-dimethylpiperzine. The surface of the coated support is freed of excess solution and thereafter contacted with an organic solution of a polyacyl halide for a period of time sufficient to form a polymerized reaction product within and/or on the support material. The resulting composite is then treated with a hydroxypolycarboxylic acid, polyaminoalkylene polycarboxylic acid, sulfonic acid, amine salts of acids, amino acid, amino acid salt, polymeric acid and inorganic acid, before drying of the membrane.

In U.S. Pat. No. 5,576,057, inventors Hirose et al., which issued Nov. 19, 1996, and which is incorporated herein by reference, there is disclosed a composite reverse osmosis membrane comprising a polyamide type skin layer on a porous support, said membrane being formed by coating a solution A containing a compound having at least two reactive amino groups on the porous support and, thereafter, contacting a solution B containing a polyfunctional acid halide with the coated layer of solution A, wherein the difference between a solubility parameter of solution A and a solubility parameter of solution B is from 7 to 15 (cal/cm$^3$)$^{1/2}$.

Examples of the solvent for solution A set forth in Hirose et al. ('057) are a mixed solvent of water and an alcohol such as ethanol, propanol, butanol, butyl alcohol, 1-pentanol, 2-pentanol, t-amyl alcohol, isoamyl alcohol, isobutyl alcohol, isopropyl alcohol, undecanol, 2-ethylbutanol, 2-ethylhexanol, octanol, cyclohexanol, tetrahydrofurfuryl alcohol, neopentyl glycol, t-butanol, benzyl alcohol, 4-methyl-2-pentanol, 3-methyl-2-butanol, pentyl alcohol, allyl alcohol, ethylene glycol, diethylene glycol, triethylene glycol, tetraethylene glycol, propanediol, butanediol, pentanediol, hexanediol, glycerol, etc.; and a mixed solvent of water and a nitrogen compound such as nitromethane, formamide, methylformamide, acetonitrile, dimethylformamide, ethylformamide, etc. As an example of the mixing ratio of water and the other solvent of solution A, Hirose et al. ('057) states that the mixing ratio of water/ethanol can be selected in the range of (50 to 90)/(50 to 10), and preferably (60 to 90)/(40 to 10). Hirose et al. ('057) elsewhere states that the amine salts described in JP-A-2-187135 (corresponding to U.S. Pat. No. 4,872,984), such as a salt of a tetraalkylammonium halide or a trialkylamine and an organic acid can also be suitably used for the solution A to facilitate the film formation, improve the absorption of the amine solution in the support, and accelerate the condensation reaction.

In U.S. Pat. No. 5,614,099, inventors Hirose et al., which issued Mar. 25, 1997, and which is incorporated herein by reference, there is disclosed a composite reverse osmosis membrane having a polyamide type skin layer whose average surface roughness is at least 55 nm. The polyamide type skin layer comprises the reaction product of a compound having amino groups and a polyfunctional acid halide compound having acid halide groups. A polymer film may be formed by contacting a solution containing, for example, m-phenylenediamine with a porous polysulfone supporting film so as to form a layer of the solution on the supporting film, then contacting the film with a solution of trimesic acid chloride and holding the film in a hot air dryer so that a polymer film is formed on the supporting film. The surface of the polyamide type skin layer can also be treated with quaternary ammonium salt and coated with a cross-linked layer of an organic polymer having positively-charged groups.

According to Hirose et al. ('099), the compound having multiple amino groups is preferably present in a solution A, said solution A comprising a compound having a solubility parameter of 8–14 (cal/cm$^3$)$^{1/2}$, said compound being selected from the group consisting of certain alcohols, ethers, ketones, esters, halogenated hydrocarbons and sulfur-containing compounds. Specific examples of said compound are disclosed in the Hirose et al. ('099) patent. Elsewhere, Hirose et al. ('099) states that the amine salts described in JP-A-2-187135, such as a salt of a tetraalkylammonium halide or a trialkylamine and an organic acid can also be suitably used for the solution to facilitate the film formation, improve the absorption of the amine solution in the support, and accelerate the condensation reaction.

Although the membranes described above possess a relatively high degree of water permeability, it is nonetheless still desirable to further improve the flux of these types of membranes so that they can be operated at lower pressures, such as at 120 psi, in order to conserve energy while still maintaining a high degree of salt rejection.

Other patents of interest include U.S. Pat. No. 4,950,404, inventor Chau, issued Aug. 21, 1990; U.S. Pat. No. 4,761,234, inventors Uemura et al., which issued Aug. 2, 1988; U.S. Pat. No. 4,769,148, inventors Fibiger et al., which issued Sep. 6, 1988; U.S. Pat. No. 5,693,227, inventor Costa, which issued Dec. 2, 1997; U.S. Pat. No. 5,746,917, inventor Altmeier, which issued May 5, 1998; U.S. Pat. No. 4,830,885, inventors Tran et al., which issued May 16, 1989; and U.S. Pat. No. 4,980,067, inventors Hou et al., which issued Dec. 25, 1990, all of which are incorporated herein by reference.

With respect to the aforementioned Costa patent, the present inventors note that the N,N-dimethylaminopyridine disclosed therein is said to be used to catalyze an interfacial polymerization reaction between a polyfunctional diamine and a polyacyl halide on a microporous support and is not taught or suggested therein to be used as an acid acceptor or pore former.

A commonly-assigned, co-pending application of interest to the present invention is U.S. patent application Ser. No.09/067,891, filed Apr. 28, 1998, inventors Ja-young Koo and Young Seo Yoon, which application is incorporated herein by reference. The aforementioned patent application relates to, in one aspect, a polyamide membrane that is the reaction product of (i) a polyfunctional amine and (ii) an amine-reactive reactant selected from the group consisting of a polyfunctional acyl halide, a polyfunctional sulfonyl halide and a polyfunctional isocyanate (iii) in the presence of a salt-containing compound, said salt-containing compound being a reaction product of a strong acid and a polyfunctional tertiary amine. Said salt-containing compound is said preferably to be the reaction product of a strong acid and a polyfunctional tertiary amine, wherein said polyfunctional tertiary amine has n tertiary amine groups, n being greater than or equal to 2, and wherein said polyfunctional tertiary amine and said strong acid are reacted together in a molar ratio that is greater than or equal to 1:1, respectively, and is less than 1:n, respectively. A composite reverse osmosis membrane that includes the aforementioned polyamide membrane is made, in accordance with the teachings of said patent application, by (a) coating a porous support with an aqueous solution comprising said polyfunctional amine and said salt-containing compound so as to form a liquid layer on said porous support; (b) contacting said liquid layer with an organic solvent solution comprising said amine-reactive reactant so as to interfacially condense said amine-reactive reactant with said polyfunctional amine, thereby forming a cross-linked, interfacial polyamide layer on said porous support; and (c) drying the product of step (b) at a temperature of 50° C. to 130° C. to form a composite reverse osmosis membrane.

Another commonly-assigned, co-pending application of interest is U.S. patent application Ser. No. 09/172,594, filed Oct. 14, 1998, inventors Ja-young Koo, Young Seo Yoon, Jong-Eun Kim and Nowon Kim, which application is incorporated herein by reference. The aforementioned patent application relates to, in one aspect, a polyamide membrane that is the reaction product of (i) an aqueous solution comprising a polyfunctional amine, a salt-containing compound and one or more polar solvents, said salt-containing compound comprising at least one tertiary amine salt functional group and at least one tertiary amine functional group; and (ii) an organic solvent solution comprising an amine-reactive reactant selected from the group consisting of a polyfunctional acyl halide, a polyfunctional sulfonyl halide and a polyfunctional isocyanate. Said salt-containing compound is said preferably to be the reaction product of a strong acid and a polyfunctional tertiary amine, wherein said polyfunctional tertiary amine has n tertiary amine groups, n being greater than or equal to 2, and wherein said polyfunctional tertiary amine and said strong acid are reacted together in a molar ratio that is greater than or equal to 1:1, respectively, and is less than 1:n, respectively. A composite reverse osmosis membrane that includes the aforementioned polyamide membrane is made, in accordance with the teachings of said patent application, by (a) coating a porous support with said aqueous solution so as to form a liquid layer on said porous support; (b) contacting said liquid layer with said organic solvent solution so as to interfacially condense said amine-reactive reactant with said polyfunctional amine, thereby forming a cross-linked, interfacial polyamide layer on said porous support; and (c) drying the product of step (b) at a temperature of 50° C. to 130° C. to form a composite reverse osmosis membrane.

Although each of the two foregoing commonly-assigned, co-pending applications teaches that the aqueous solution includes, in addition to the polyamine, the reaction product of a strong acid and a polyfunctional tertiary amine, neither of said applications teaches or suggests reacting together said polyfunctional tertiary amine and said strong acid in a molar ratio that is greater than or equal to 1:0, respectively, and is less than 1:1, respectively. In addition, neither of said two applications teaches or suggests drying the interfacial reaction product at a temperature less than 50° C.

SUMMARY OF THE INVENTION

It is an object of the present invention to provide a novel polyamide membrane.

According to one embodiment of the invention, there is provided a polyamide membrane comprising a reaction product of (i) an aqueous solution comprising a polyfunctional amine and a reaction product of a polyfunctional tertiary amine and an acid, said polyfunctional tertiary amine and said acid being reacted together in a molar ratio that is greater than or equal to 1:0, respectively, and is less than 1:1, respectively; and (ii) an organic solvent solution comprising an amine-reactive reactant selected from the group consisting of a polyfunctional acyl halide, a polyfunctional sulfonyl halide and a polyfunctional isocyanate.

Preferably, said polyfunctional tertiary amine is selected from the group consisting of (i) an alkane having a backbone carbon number ranging from 2 to 10, with said alkane having at least two tertiary amine groups as side chains on said carbon backbone or as a part of said backbone, (ii) a cyclic hydrocarbon having a ring member ranging from 3 to 10, with said cyclic hydrocarbon having at least two tertiary amine groups as side chains on said ring, and (iii) a cyclic compound having a ring member ranging from 4 to 10, with said cyclic compound having at least two tertiary amine groups as part of the cyclic ring structure. Particularly preferred examples of said polyfunctional tertiary amine include N,N,N',N'-tetramethyl-1,6-hexanediamine, N,N,N', N'-tetramethyl-1,4-butanediamine, N,N,N',N'-tetramethyl-2-butene-1,4-diamine, N,N,N',N'-tetramethyl-1,3-butanediamine, N,N,N',N'-tetramethyl-1,3-propanediamine and 1,4-dimethylpiperazine.

In addition, said polyfunctional amine preferably is selected from the group consisting of aromatic primary amines, alkane primary diamines, cycloaliphatic primary diamines, cycloaliphatic secondary diamines, piperazine and aromatic secondary amines. A particularly preferred polyfunctional amine is meta-phenylenediamine.

Said polyfunctional amine is preferably present in said aqueous solution in an amount constituting about 0.1 to 20 wt. % of said aqueous solution. Where the molar ratio of said polyfunctional tertiary amine to said acid is equal to 1:0, said polyfunctional tertiary amine is preferably present in said aqueous solution in an amount constituting about 0.05 to 6 wt. %, more preferably about 0.1 to 3 wt. %, of said aqueous solution. Even more preferably, said polyfunctional amine and said polyfunctional tertiary amine are present in said aqueous solution in a weight ratio range of about 1.5:1, respectively, to about 10:1, respectively. Where the molar ratio of said polyfunctional tertiary amine to said acid is greater than 1:0, said polyfunctional tertiary amine is preferably present in said aqueous solution in an amount constituting about 0.1 to 12 wt. %, more preferably 0.1 to 9 wt. %, even more preferably 0.2 to 7 wt. %, of said aqueous solution.

Said amine-reactive reactant is preferably selected from the group consisting of an isophthaloyl halide, a terephthaloyl halide, a trimesoyl halide and mixtures thereof. A particularly preferred amine-reactive reactant is trimesoyl chloride. Said amine-reactive reactant is preferably present in said organic solvent solution in an amount constituting about 0.01 to 10 wt. % of said organic solvent solution.

Preferably, said aqueous solution further comprises one or more polar solvents, said one or more polar solvents preferably being selected from the group consisting of ethylene glycol derivatives, 1,3-propanediol derivatives, sulfoxide derivatives, sulfone derivatives, nitrile derivatives, ketone derivatives and urea derivatives. Examples of particularly preferred polar solvents include 2-methoxyethanol, 2-ethoxyethanol, 2-propoxyethanol, 2-butoxyethanol, di(ethylene glycol) t-butylmethyl ether, di(ethylene glycol) dimethyl ether, di(ethylene glycol) methyl ether, di(ethylene glycol) ethyl ether, (2-methoxyethyl) ether, (2-ethoxyethyl) ether, 1,3-heptanediol, 2-ethyl-1,3-hexanediol, 1,3-hexanediol, 1,3-pentanediol, dimethyl sulfoxide, tetramethylene sufoxide, butyl sulfoxide, methylphenyl sulfoxide, dimethyl sulfone, butyl sulfone, acetonitrile, propionitrile, acetone, 2-butanone, 2-hexanone, 3-hexanone, 2-pentanone, 3-pentanone, cyclohexanone, cyclopentantone, and 1,3-dimethyl-2-imidazolidinone. Said one or more polar solvents are preferably present in said aqueous solution in an amount constituting about 0.01 to 8 wt. % of said aqueous solution.

According to another embodiment of the invention, there is provided a polyamide membrane comprising a reaction product of (i) an aqueous solution comprising a polyfunctional amine and a reaction product of a polyfunctional tertiary amine and an acid anhydride, said polyfunctional tertiary amine and said acid anhydride being reacted together in a molar ratio that is greater than 1:0, respectively, and is less than or equal to 1:0.5, respectively; and (ii) an organic solvent solution comprising an amine-reactive reactant selected from the group consisting of a polyfunctional acyl halide, a polyfunctional sulfonyl halide and a polyfunctional isocyanate.

Preferably, said polyfunctional amine, said polyfunctional tertiary amine and said amine-reactive reactant are as described above in connection with the previous embodiment. Said acid anhydride is preferably selected from the group consisting of a carboxylic acid anhydride, a sulfonic acid anhydride and mixtures thereof. Particularly preferred carboxylic acid anhydrides include acetic anhydride, propionic anhydride, butyric anhydride, hexanoic anhydride, and benzoic anhydride.

Said aqueous solution preferably further includes one or more polar solvents, said polar solvents being as described in the previous embodiment.

According to yet another embodiment of the invention, there is provided a polyamide membrane comprising a polyfunctional amine, one or more polar solvents, and a reaction product of a tertiary amine and an acid, said tertiary amine being selected from the group consisting of triethylamine; N,N'-dimethylbutylamine; N,N'-dimethylbenzylamine; and N,N,N',N'-tetramethylethylenediamine, said tertiary amine and said acid being reacted together in a molar ratio equal to 1:0, respectively; and (ii) an organic solvent solution comprising an amine-reactive reactant selected from the group consisting of a polyfunctional acyl halide, a polyfunctional sulfonyl halide and a polyfunctional isocyanate.

Preferably, said polyfunctional amine and amine-reactive reactant are as described above in a previous embodiment. Said one or more polar solvent are preferably selected from the group consisting of ethylene glycol derivatives, 1,3-propanediol derivatives, sulfoxide derivatives, sulfone derivatives, nitrile derivatives, ketone derivatives and urea derivatives. A particularly preferred polar solvent is 2-ethyl-1,3-hexanediol.

The present invention is also directed to a composite reverse osmosis membrane comprising a porous support and a polyamide membrane of the types broadly described above.

It is another object of the present invention to provide a method of producing a composite reverse osmosis membrane.

Consequently, according to one embodiment of the invention, there is provided a method of making a composite reverse osmosis membrane, said method comprising the steps of (a) coating a porous support with an aqueous solution, said aqueous solution comprising a polyfunctional amine and a compound selected from the group consisting of a polyfunctional tertiary amine and a salt of said polyfunctional tertiary amine, so as to form a liquid layer on said porous support; (b) contacting said liquid layer with an organic solvent solution, said organic solvent solution comprising an amine-reactive reactant selected from the group consisting of a polyfunctional acyl halide, a polyfunctional sulfonyl halide and a polyfunctional isocyanate, so as to interfacially condense said amine-reactive reactant with said polyfunctional amine, thereby forming a cross-linked, interfacial polyamide layer on said porous support; and (c) drying the product of step (b) at a temperature below 50° C., preferably at around room temperature, to form a composite reverse osmosis membrane.

Preferably, said polyfunctional amine, said polyfunctional tertiary amine, said salt of said polyfunctional tertiary amine, and said amine-reactive reactant are as described above. More preferably, said polyfunctional tertiary amine salt is the reaction product of said polyfunctional tertiary amine and an acid. Even more preferably, said polyfunctional tertiary amine has n tertiary amine groups, n being greater than or equal to 2, and said polyfunctional tertiary amine and said acid are reacted together in a molar ratio that is greater than 1:0, respectively, and is less than 1:n, respectively, more preferably less than 1:(0.95)n, respectively, even more preferably less than 1:(0.9)n, respectively.

Said aqueous solution preferably further comprises one or more polar solvents, preferably selected from the polar solvents described above.

Said method preferably further comprises the step of rinsing the product of step (c) in a basic aqueous solution.

According to still another embodiment of the invention, there is provided a method of making a composite reverse osmosis membrane, said method comprising the steps of (a) coating a porous support with a first aqueous solution, said first aqueous solution comprising one of a polyfunctional tertiary amine and a salt of said polyfunctional tertiary amine, so as to form a first liquid layer on said porous support; (b) coating the first liquid layer with a second aqueous solution, said second aqueous solution comprising a polyfunctional amine, so as to form a second liquid layer over said first liquid layer; (c) contacting the twice-coated porous support with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and (d) drying the product of step (c) at a temperature below 50° C., preferably at room temperature, to form a composite reverse osmosis membrane.

Preferably, said polyfunctional amine, said polyfunctional tertiary amine, said salt of said polyfunctional tertiary amine, and said amine-reactive reactant are as described above. More preferably, said polyfunctional tertiary amine salt is the reaction product of said polyfunctional tertiary amine and an acid. Even more preferably, said polyfunctional tertiary amine has n tertiary amine groups, n being greater than or equal to 2, and said polyfunctional tertiary amine and said acid are reacted together in a molar ratio that is greater than 1:0, respectively, and is less than 1:n, respectively, more preferably less than 1:(0.95)n, respectively, even more preferably less than 1:(0.9)n, respectively.

Said aqueous solution preferably further comprises one or more polar solvents, preferably selected from the polar solvents described above.

Said method preferably further comprises the step of rinsing the product of step (c) in a basic aqueous solution.

Additional objects, features, aspects and advantages of the present invention will be set forth, in part, in the description which follows and, in part, will be obvious from the description or may be learned by practice of the invention. Certain embodiments of the invention will be described hereafter in sufficient detail to enable those skilled in the art to practice the invention, and it is to be understood that other embodiments may be utilized and that structural or other changes may be made without departing from the scope of the invention. The following detailed description is, therefore, not to be taken in a limiting sense, and the scope of the present invention is best defined by the appended claims.

DETAILED DESCRIPTION OF PREFERRED EMBODIMENTS

As set forth above, according to one aspect of the invention, a free polyfunctional tertiary amine or the reaction product of a polyfunctional tertiary amine and an acid that are reacted together in a molar ratio of greater than 1:0, respectively, and less than 1:1, respectively, is included in an aqueous solution comprising a polyfunctional amine, the aqueous solution being coated onto a porous support and then contacted with an organic solvent solution comprising an amine-reactive reactant selected from the group consisting of a polyfunctional acyl halide, a polyfunctional sulfonyl halide and a polyfunctional isocyanate.

According to another aspect of the invention, the reaction product of a polyfunctional tertiary amine and an acid anhydride that are reacted together in a molar ratio that is greater than 1:0, respectively, and is less than or equal to 1:0.5, respectively is included in an aqueous solution comprising a polyfunctional amine, the aqueous solution being coated onto a porous support and then contacted with an organic solvent solution comprising an amine-reactive reactant selected from the group consisting of a polyfunctional acyl halide, a polyfunctional sulfonyl halide and a polyfunctional isocyanate.

According to still another aspect of the invention, one or more polar solvents and a free tertiary amine selected from the group consisting of triethylamine, N,N'-dimethylbutylamine, N,N'-dimethylbenzylamine, and N,N,N',N'-tetramethylethylenedianine is included in an aqueous solution comprising a polyfunctional amine, the aqueous solution being coated onto a porous support and then contacted with an organic solvent solution comprising an amine-reactive reactant selected from the group consisting of a polyfunctional acyl halide, a polyfunctional sulfonyl halide and a polyfunctional isocyanate.

According to still yet another aspect of the invention, a composite reverse osmosis membrane is made by (a) coating a porous support with an aqueous solution, said aqueous solution comprising a polyfunctional amine and a compound selected from the group consisting of a polyfunctional tertiary amine and a salt of said polyfunctional tertiary amine, so as to form a liquid layer on said porous support; (b) contacting said liquid layer with an organic solvent solution, said organic solvent solution comprising an amine-reactive reactant selected from the group consisting of a polyfunctional acyl halide, a polyfunctional sulfonyl halide and a polyfunctional isocyanate, so as to interfacially condense said amine-reactive reactant with said polyfunctional amine, thereby forming a cross-linked, interfacial polyamide layer on said porous support; and (c) drying the product of step (b) at a temperature below 50° C., preferably at around room temperature.

According to a further aspect of the invention, the above-described method is modified by (a) coating the porous support with a first aqueous solution comprising said polyfunctional tertiary amine or said salt of said polyfunctional tertiary amine so as to form a first liquid layer on said porous support; (b) coating the first liquid layer with a second aqueous solution, said second aqueous solution comprising said polyfunctional amine, so as to form a second liquid layer over said first liquid layer; (c) contacting said second liquid layer with said organic solvent solution, said organic solvent solution comprising said amine-reactive reactant, so as to interfacially condense said amine-reactive reactant with said polyfunctional amine, thereby forming a cross-linked, interfacial polyamide layer on said porous support; and (d) drying the product of step (b) at a temperature below 50° C., preferably at around room temperature.

The porous support of the present invention is typically a microporous support. The particular microporous support employed in the present invention is not critical thereto but is generally a polymeric material containing pore sizes which are of sufficient size to permit the passage of permeate therethrough but not large enough so as to interfere with the bridging over of the ultrathin membrane formed thereon. The pore size of the support will generally range from 1 to 500 nanometers inasmuch as pores which are larger in diameter than 500 nanometers will permit the ultrathin film to sag into the pores, thus disrupting the flat sheet configuration desired. Examples of microporous supports useful in the present invention include those made of a polysulfone, a polyether sulfone, a polyimide, a polyamide, polypropylene and various halogenated polymers, such as polyvinylidene fluoride. Additional microporous support materials may be found in the patents incorporated herein by reference.

The thickness of the microporous support is not critical to the present invention. Generally, the thickness of the microporous support is about 25 to 125 $\mu$m, preferably about 40 to 75 $\mu$m.

The polyfunctional amine reactant employed in the present invention is preferably an essentially monomeric amine having at least two amine functional groups, more preferably 2 to 3 amine functional groups. The amine functional group is typically a primary or secondary amine functional group, preferably a primary amine functional group. The particular polyamine employed in the present invention is not critical thereto and may be a single polyamine or a combination thereof. Examples of suitable polyamines include aromatic primary diamines, such as meta-phenylenediamine and para-phenylenediamine and substituted derivatives thereof, wherein the substituent includes, e.g., an alkyl group, such as a methyl group or an ethyl group, an alkoxy group, such as a methoxy group or an ethoxy group, a hydroxy alkyl group, a hydroxy group or a halogen atom. Additional examples of suitable polyamines include alkanediamines, such as 1,3-propanediamine and its homologs with or without N-alkyl or aryl substituents, cycloaliphatic primary diamines, such as cyclohexane diamine, cycloaliphatic secondary diamines, such as piperazine and its alkyl derivatives, aromatic secondary amines, such as N,N'-dimethyl-1,3-phenylenediamine, N,N'-diphenylethylene diamine, benzidine, xylylene diamine and derivatives thereof. Other suitable polyamines may be found in the patents incorporated herein by reference. The preferred polyamines of the present invention are aromatic primary diamines, more preferably m-phenylenediamine.

The polyamine is present in an aqueous solution in an amount in the range of from about 0.1 to 20%, preferably 0.5 to 8%, by weight, of the aqueous solution. The pH of the aqueous solution is in the range of from about 7 to 13. The pH can be adjusted by the addition of a basic acid acceptor in an amount ranging from about 0.001% to about 5%, by weight, of the solution. Examples of the aforementioned basic acid acceptor include hydroxides, carboxylates, carbonates, borates, and phosphates of alkali metals, as well as trialkylamines.

As noted above, in addition to the aforementioned polyamine, the aqueous solution further comprises, in one embodiment, a polyfunctional tertiary amine or a salt of a polyfunctional tertiary amine. Preferably, said polyfunctional tertiary amine is selected from the group consisting of (i) an alkane having a backbone carbon number ranging from 2 to 10, with said alkane having at least two tertiary amine groups as side chains on said carbon backbone, (ii) a cyclic hydrocarbon having a ring member ranging from 3 to 10, with said cyclic hydrocarbon having at least two tertiary amine groups as side chains on said ring, and (iii) a cyclic compound having a ring member ranging from 4 to 10, with said cyclic compound having at least two tertiary amine groups as part of the cyclic ring structure. As will be seen below, the addition of said polyfunctional tertiary amine and/or its salt to said aqueous solution typically results in a flux increase of the resultant membrane.

Examples of the first class of polyfunctional tertiary amine identified above include N,N,N',N'-tetramethyl-1,6-hexanediamine, N,N,N',N'-tetramethyl-1,4-butanediamine, N,N,N',N'-tetramethyl-2-butene-1,4-diamine, N,N,N',N'-tetramethyl-1,3-butanediamine, N,N,N',N'-tetramethyl-1,3-propanediamine, N,N,N',N'-tetramethyl-1,8-octanediamine, N,N,N',N'-tetramethyl-1,7-heptanediamine, N,N,N',N'-tetramethyl-1,5-pentanediamine, N,N,N',N'-tetraethyl-1,4-butanediamine, N,N,N',N'-tetraethyl-1,3-butanediamine, N,N,N',N'-tetraethyl-1,3-propanediamine, and N,N,N',N'-tetraethylethylenediamine, with N,N,N',N'-tetramethyl-1,6-hexanediamine, N,N,N',N'-tetramethyl-1,4-butanediamine, N,N,N',N'-tetramethyl-2-butene-1,4-diamine, N,N,N',N'-tetramethyl-1,3-butanediamine, N,N,N',N'-tetramethyl-1,3-propanediamine being preferred and N,N,N',N'-tetramethyl-1,6-hexanediamine being more preferred.

Examples of the second class of polyfunctional tertiary amine identified above include N,N,N'N'-tetramethyl-1,n-cyclohexanediamine wherein n is 2–4 and N,N,N'N'-tetramethyl-1,n-cyclohexanebis (methylamine) wherein n is 2–4.

Examples of the third class of polyfunctional tertiary amine identified above include 1,4-dimethylpiperazine.

Where said polyfunctional tertiary amine is included in the aqueous solution as free polyfunctional tertiary amine (as opposed to the corresponding salt), said polyfunctional tertiary amine is preferably present in said aqueous solution in an amount constituting about 0.05 to 6 wt. %, more preferably about 0.1 to 3 wt. %, of said aqueous solution. Even more preferably, said polyfunctional amine and said polyfunctional tertiary amine are present in said aqueous solution in a weight ratio range of about 1.5:1, respectively, to about 10:1, respectively.

Said salt of said polyfunctional tertiary amine is preferably obtained by reacting said polyfunctional tertiary amine together with an acid. Examples of acids suitable for use in the present invention include methanesulfonic acid (MSA), toluenesulfonic acid (TSA), camphorsulfonic acid (CSA), ethanesulfonic acid (ESA), benzenesulfonic acid (BSA), and other aromatic, aliphatic, and cycloaliphatic sulfonic acids, trifluoroacetic acid, nitric acid, hydrochloric acid, phosphoric acid, an alkyl phosphonic acid, an aryl phosphonic acid, carboxylic acid, sulfuric acid and mixtures thereof.

Preferably, said polyfunctional tertiary amine and said acid are reacted together in a molar ratio that is greater than 1:0, respectively, and is less than 1:n, respectively. More preferably, said molar ratio of said polyfunctional tertiary amine to said acid is greater than 1:0 and less than or equal to 1:(0.95)n and even more preferably is greater than 1:0 and less than or equal to 1:(0.9)n.

Said polyfunctional tertiary amine salt is preferably present in said aqueous solution in an amount constituting about 0.1 to 12 wt. %, more preferably 0.1 to 9 wt. %, even more preferably 0.2 to 7 wt. %, of said aqueous solution.

As also noted above, in addition to the polyfunctional amine and polyfunctional tertiary amine or polyfunctional tertiary amine salt, the aqueous solution preferably further comprises one or more polar solvents, said one or more polar solvents being selected from the group consisting of ethylene glycol derivatives, 1,3-propanediol derivatives, sulfoxide derivatives, sulfone derivatives, nitrile derivatives, ketone derivatives, urea derivatives, and mixtures thereof. As will be seen below, the addition of said one or more polar solvents to said aqueous solution typically results in a flux increase of the resultant membrane.

Examples of ethylene glycol derivatives suitable for use in the present invention include alkoxyethanols, such as 2-methoxyethanol, 2-ethoxyethanol, 2-propoxyethanol and 2-butoxyethanol, di(ethylene glycol) t-butylmethyl ether, di(ethylene glycol)methyl ether, di(ethylene glycol) ethyl ether, (2-methoxyethyl) ether and (2-ethoxyethyl) ether.

Examples of 1,3-propanediol derivatives suitable for use in the present invention include 1,3-heptanediol, 2-ethyl-1, 3-hexanediol, 1,3-hexanediol and 1,3-pentanediol.

Examples of sulfoxide derivatives suitable for use in the present invention include dimethyl sulfoxide, tetramethylene sulfoxide, butyl sulfoxide and methylphenyl sulfoxide. Examples of sulfone derivatives suitable for use in the present invention include dimethyl sulfone, ethylsulfone and butyl sulfone.

Examples of nitrile derivatives suitable for use in the present invention include acetonitrile and propionitrile. Examples of ketone derivatives suitable for use in the present invention include acetone, 2-butanone, 2-hexanone, 3-hexanone, 2-pentanone, 3-pentanone, cyclohexanone and cyclopentanone. An example of a urea derivative suitable for use in the present invention is 1,3-dimethyl-2-imidazolidinone.

Said one or more polar solvents of said aqueous solution preferably constitute a combined total of about 0.01%–8%, by weight, of said aqueous solution.

Where an alkoxyethanol is used as a polar solvent, it preferably constitutes about 0.05 to 4.0 wt. % of said aqueous solution. Where 1,3-heptanediol is used as a polar solvent, it preferably constitutes about 0.01 to 1.0 wt. % of said aqueous solution. Where 2-ethyl-1,3-hexanediol is used as a polar solvent, it preferably constitutes about 0.01 to 1.0 wt. % of said aqueous solution. Where butylsulfoxide is used as a polar solvent, it preferably constitutes about 0.01 to 1.0 wt. % of said aqueous solution. Where methylphenylsulfoxide is used as a polar solvent, it preferably constitutes about 0.01 to 1.0 wt. % of said aqueous solution. Where butyl sulfone is used as a polar solvent, it preferably constitutes about 0.01 to 1.0 wt. % of said aqueous solution. Where a ketone derivative is used as a polar solvent, it preferably constitutes about 0.01 to 4.0 wt. % of said aqueous solution.

In another embodiment, instead of including a free polyfunctional tertiary amine or the reaction product of said polyfunctional tertiary amine and an acid, the aqueous solution further comprises, in addition to the polyfunctional amine, the reaction product of a polyfunctional tertiary amine and an acid anhydride. As will be seen below, the addition of said reaction product of said polyfunctional tertiary amine and said acid anhydride to said aqueous solution typically results in a flux increase of the resultant membrane.

The polyfunctional tertiary amine of said embodiment is as described above in the previous embodiment. The acid anhydride is preferably selected from the group consisting of a carboxylic acid anhydride, a sulfonic acid anhydride and mixtures thereof. Particularly preferred carboxylic acid anhydrides include acetic anhydride, propionic anhydride, butyric anhydride, hexanoic anhydride, and benzoic anhydride. Preferably, the polyfunctional tertiary amine and the acid anhydride are reacted together in a molar ratio that is greater than 1:0, respectively, and is less than or equal to 1:0.5, respectively.

One or more polar solvents of the type described above are preferably additionally included in the aqueous solution together with the polyfunctional amine and the reaction product of the polyfunctional tertiary amine and the acid anhydride. As will be seen below, the addition of said one or more polar solvents to the aqueous solution typically results in a flux increase of the resultant membrane.

The polyfunctional amine and acid anhydride can be mixed together and then added to the aqueous solution, or they can be added separately to the aqueous solution.

In still another embodiment, one or more polar solvents of the type described above and a free tertiary amine selected from the group consisting of triethylamine, N,N'-dimethylbutylamine, N,N'-dimethylbenzylamine and N,N,N',N'-tetramethylethylenediamine are included in the aqueous solution containing the polyfunctional amine. As will be seen below, the combination of said polar solvent and said free tertiary amine results in an increase in flux as compared to that obtained with said free tertiary amine in the absence of said polar solvent.

The amine-reactive reactant employed in the present invention is one or more compounds selected from the group consisting of a polyfunctional acyl halide, a polyfunctional sulfonyl halide and a polyfunctional isocyanate. Preferably, the amine-reactive reactant is an essentially monomeric, aromatic, polyfunctional acyl halide, examples of which include di- or tricarboxylic acid halides, such as trimesoyl chloride (TMC), isophthaloyl chloride (IPC), terephthaloyl chloride (TPC) and mixtures thereof. Examples of other amine-reactive reactants are disclosed in the patents incorporated herein by reference.

The amine-reactive reactant is present in an organic solvent solution, the solvent for said organic solvent solution comprising any organic liquid immiscible with water. The amine-reactive reactant is present in the organic liquid in an amount in the range of from about 0.005 to 5 wt. % preferably 0.01 to 0.5 wt. % of the solution. Examples of the aforementioned organic liquid include hexane, cyclohexane, heptane, alkanes having from 8 to 12 carbon atoms, and halogenated hydrocarbons, such as the FREON series. Other examples of the above-described organic liquid may be found in the patents incorporated herein by reference. Preferred organic solvents are alkanes having from 8 to 12 carbon atoms and mixtures thereof. ISOPAR® solvent (Exxon Corp.) is such a mixture of alkanes having from 8 to 12 carbon atoms.

In accordance with the method of the present invention, the above-described porous support is coated with the above-described aqueous solution utilizing either a hand coating or a continuous operation, and the excess solution is removed from the support by rolling, sponging, air knifing or other suitable techniques. Following this, the coated support material is then contacted, for example, by dipping or spraying, with the above-described organic solvent solution and allowed to remain in place for a period of time in the range of from about 5 seconds to about 10 minutes, preferably about 20 seconds to 4 minutes. The resulting product is then dried at a temperature below 50° C., preferably by air-dying at room temperature, for about 1 minute, and then rinsed in a basic aqueous solution for about 1 to 30 minutes at about room temperature to 95° C.

The following examples are provided for illustrative purposes only and are in no way intended to limit the scope of the present invention:

EXAMPLE 1

A 140 µm thick microporous polysulfone support including the backing non-woven fabric was soaked in an aqueous solution containing 1.6 wt. % of meta-phenylenediamine (MPD) and 0.6 wt. % N,N,N',N'-tetramethyl-1,6-hexanediamine (TMHD) for 40 seconds. The support was drained and nip rolled to remove the excess aqueous solution. Then, the coated support was dipped in 0.1 wt. % solution of trimesoyl chloride (TMC) in Isopar® solvent (Exxon Corp.) for 1 minute followed by draining the excess organic solution off the support. The resulting composite membrane was air-dried for about 1 minute and then rinsed in 0.2% Na$_2$CO$_3$ aqueous solution for 30 minutes at room temperature before performance test. The performance of the reverse osmosis membrane was measured by passing an aqueous solution containing 2000 ppm of NaCl through the membrane at 225 psi. The salt rejection was 96.8% and the flux was 45.8 gfd.

EXAMPLES 2–16 and COMPARATIVE EXAMPLE A

The same procedure as set forth in Example 1 was carried out for each of Examples 2–16 and Comparative Example A, except that the concentrations of MPD and TMHD listed in TABLE I were used instead off those in Example 1.

TABLE I

| Example | MPD (wt %) | TMHD (wt %) | Flux (gfd) | Rejection (%) | MPD/TMHD ratio |
|---|---|---|---|---|---|
| Comp. A | 1.0 | 0 | 17.8 | 96.9 | — |
| 2 | 0.8 | 0.1 | 26.4 | 95.9 | 8 |
| 3 | 1.0 | 0.05 | 20.6 | 90.4 | 20 |
| 4 | 1.0 | 0.1 | 21.9 | 95.8 | 10 |
| 5 | 1.0 | 0.15 | 27.2 | 96.6 | 6.7 |
| 6 | 1.0 | 0.3 | 36.2 | 98.1 | 3.3 |
| 7 | 1.0 | 0.5 | 55.3 | 95.6 | 2.0 |
| 8 | 1.0 | 0.8 | 94.7 | 63.5 | 1.25 |
| 9 | 1.6 | 0.2 | 24.1 | 98.1 | 8 |
| 10 | 1.6 | 0.4 | 34.1 | 97.6 | 4 |
| 11 | 1.6 | 0.7 | 49.9 | 95.6 | 2.3 |
| 12 | 1.6 | 0.9 | 72.3 | 79.0 | 1.78 |
| 13 | 2.0 | 0.3 | 18.1 | 96.2 | 6.7 |
| 14 | 2.0 | 0.5 | 33.9 | 97.5 | 4 |
| 15 | 2.0 | 0.8 | 39.9 | 89.2 | 2.5 |
| 16 | 3.0 | 2.0 | 26.1 | 96.4 | 1.5 |

Table I suggests that an MPD/TMHD ratio in the range of about 1.5 to 10 is preferred.

EXAMPLE 17

The same procedure as set forth in Example 1 was repeated, except that a mixture of 0.6 wt. % THMD and 0.06 wt. % toluenesulfonic acid (TSA) was used instead of only 0.6 wt. % TMHD. The flux and the salt rejection of the resultant membrane were 38.9 gfd and 97%, respectively.

EXAMPLES 18–25 AND COMPARATIVE EXAMPLE B

The same procedure as set forth in Example 1 was carried out for each of Examples 18–25 and Comparative Example B, except that various concentrations of MPD, TMHD, acids (tolune sulfonic acid and acetic acid) and acetic anhydride as listed in TABLE II were used instead of those specified in Example 1.

TABLE II

| Example | MPD (wt %) | TMHD (wt %) | TSA (wt %) | AcOH (wt %) | Ac$_2$O (wt %) | Flux (gfd) | Rejection (%) |
|---|---|---|---|---|---|---|---|
| 18 | 1.0 | 0.4 | | | | 49.4 | 95.5 |
| 19 | 1.0 | 0.4 | | | 0.006 | 48.6 | 96.7 |
| 20 | 1.0 | 0.4 | | 0.006 | | 47.1 | 96.9 |
| 21 | 1.4 | 0.5 | | | | 44.0 | 96.9 |
| 22 | 1.4 | 0.5 | 0.05 | | | 34.9 | 97.5 |
| Comp. B | 1.6 | 1.0 | | | | 79.3 | 72.7 |
| 23 | 1.6 | 1.0 | 0.8 | | | 45.9 | 97.1 |
| 24 | 1.6 | 1.0 | 1.0 | | | 34.1 | 97.4 |
| 25 | 1.6 | 2.0 | 2.2 | | | 40.5 | 97.4 |

As can be seen from the above data (for example, by a comparison of Examples 19 and 20 with Example 18), the addition of an acid or acetic anhydride to the MPD/TMHD combination improves the salt rejection.

EXAMPLE 26

The same procedure as set forth in Example 17 was repeated, except that 0.2 wt. % 2-ethyl-1,3-hexanediol (EHD) was added to the aqueous solution containing MPD, TMHD and TSA. The flux and the salt rejection of the resultant membrane were 48.7 gfd and 96.6%, respectively.

EXAMPLES 27–39

The same procedure as set forth in Example 1 was repeated for each of Examples 27–39, except that various concentrations of MPD, TMHD, TSA, Ac$_2$O and various organic solvents as listed in TABLE III were used instead of those specified in Example 1. (In TABLE III, "MEE" stands for (2-methoxyethyl) ether; "BUT" stands for 1-butanol; "BE" stands for 2-butoxyethanol; "DEGME" stands for di(ethylene glycol) methyl ether; "DEGEE" stands for di(ethylene glycol) ethyl ether; "CYHEX" stands for cyclohexanone; and "DMSO" stands for dimethylsulfoxide.)

TABLE III

| Example | MPD (wt %) | TMHD (wt %) | TSA (wt %) | Ac$_2$O (wt %) | Organic Solvent (wt %) | Flux (gfd) | Rejection (%) |
|---|---|---|---|---|---|---|---|
| 27 | 1.6 | 0.4 | | | EHD (0.2) | 46.5 | 97.1 |
| 28 | 1.6 | 0.4 | | | MEE (1) | 45.0 | 95.7 |
| 29 | 1.6 | 0.4 | | | BUT (1) | 29.2 | 97.6 |
| 30 | 1.6 | 0.4 | | | BE (0.1) | 41.5 | 96.2 |
| 31 | 1.6 | 0.4 | | | DEGME (0.2) | 47.1 | 96.2 |
| 32 | 1.6 | 0.4 | | | DEGEE (0.2) | 47.5 | 97.0 |
| 33 | 1.6 | 0.4 | | | CYHEX (0.6) | 47.0 | 95.8 |
| 34 | 1.6 | 0.5 | | 0.05 | | 37.0 | 97.4 |
| 35 | 1.6 | 0.5 | | 0.05 | EHD (0.2) | 47.2 | 96.8 |
| 36 | 1.6 | 0.5 | | 0.05 | BE (1) | 43.5 | 97.0 |
| 37 | 1.6 | 0.5 | | 0.05 | DMSO (3) | 45.3 | 96.9 |
| 38 | 1.6 | 1 | 0.9 | | | 40.1 | 97.4 |
| 39 | 1.6 | 1 | 0.9 | | EHD (0.2) | 44.8 | 96.7 |

As can be seen by comparing Examples 27–33, 35–37 and 39 from TABLE III with Example 10 from TABLE I and Examples 34 and 38, the addition of a polar solvent, except for 1-butanol, increased the membrane flux.

EXAMPLE 40

The same procedure as set forth in Example 1 was repeated, except that 1 wt. % MPD and 0.5 wt. % N,N,N',N'-tetramethyl-1,4-butanediamine were employed instead of 1.6 wt. % MPD and 0.6 wt. % TMHD. The flux and the salt rejection of the resultant membrane were 32.4 and 96.9%, respectively.

EXAMPLES 41–53 AND COMPARATIVE EXAMPLES C–F

The same procedure as set forth in Example 1 was repeated for each of Examples 41–53 and Comparative Examples C–F, except that various concentrations of MPD, tertiary amines other than THMD and various organic solvents as listed in TABLE IV were used instead of 1.6 wt. % MPD and 0.6 wt. % TMPD. (In TABLE IV, "TMBD" stands for N,N,N'N'-tetramethyl-1,3-butanediamine; "TMPD" stands for N,N,N',N'-tetramethyl-1,3-propanediamine; "TMED" stands for N,N,N',N'-tetramethylethylenediamine; "TEA" stands for triethylamine; "DMBA" stands for N,N-dimethylbenzylamine; and "1,4-DMP" stands for 1,4-dimethylpiperazine.)

TABLE IV

| Example | MPD (wt %) | Other Tertiary Amine (wt %) | Organic Solvent (wt %) | Flux (gfd) | Rejection (%) |
|---|---|---|---|---|---|
| 41 | 1 | TMBD (0.3) | | 19.0 | 98.6 |
| 42 | 1 | TMBD (0.3) | EHD (0.3) | 26.3 | 96.7 |
| 43 | 1 | TMBD (0.3) | BE (1) | 28.0 | 96.0 |
| 44 | 1 | TMBD (0.3) | DMSO (3) | 46.3 | 96.6 |
| 45 | 1 | TMBD (0.5) | | 25.9 | 97.2 |
| 46 | 1 | TMPD (0.5) | | 35.9 | 95.8 |
| Comp. C | 1 | TMED (0.5) | | 20.9 | 93.7 |
| 47 | 1 | TMED (0.3) | EHD (0.3) | 28.4 | 92.4 |
| Comp. D | 1 | TBA (0.3) | | 14.9 | 96.3 |
| Comp. E | 1 | TEA (0.5) | | 16.8 | 94.5 |
| 48 | 1 | TEA (0.5) | EHD (0.2) | 27.4 | 96.5 |
| 49 | 1.5 | TMBD (0.5) | | 22.6 | 96.9 |
| 50 | 1.5 | TMBD (0.5) | EHD (0.2) | 31.6 | 97.4 |
| 51 | 1.5 | TMBD (0.5) | BE (1) | 30.0 | 97.1 |
| Comp. F | 1.5 | DMBA (0.5) | | 19.2 | 94.9 |
| 52 | 1.5 | DMBA (0.5) | EHD (0.2) | 32.9 | 95.3 |
| 53 | 1.5 | 1,4-DMP (0.3) | EHD (0.2) | 34.8 | 97.1 |

As can be seen, for example, by comparing Examples 45 and 46 to Example 7, the use of TMBD and TMPD resulted in a flux increase, but not as great as that provided by TMHD. Also, the combination of EHD and TMBD (Example 42) and the combination of EHD and 1,4-DMP (Example 53) both resulted in considerable flux increases. In addition, the combination of DMSO and TMBD (Example 44) resulted in a notable flux increase. Finally, although the use of TMED (Comp. Example C), TEA (Comp. Examples D and E) and DMBA (Comp. Example F) alone resulted in very little or no flux increase, the combination of EHD with each of these amines (see Examples 47, 48 and 52) resulted in a considerable flux increase.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A polyamide membrane comprising a reaction product of (i) an aqueous solution comprising water, a polyfunctional amine and a reaction product of a polyfunctional tertiary amine and an acid, said polyfunctional tertiary amine and said acid being reacted together in a molar ratio that is greater than 1:0, respectively, and is less than 1:1, respectively; and (ii) an organic solvent solution comprising an amine-reactive reactant selected from the group consisting of a polyfunctional acyl halide, a polyfunctional sulfonyl halide and a polyfunctional isocyanate.

2. The polyamide membrane as claimed in claim 1 wherein said polyfunctional tertiary amine is a cyclic compound having a ring member ranging from 4 to 10, said polyfunctional tertiary amine having at least two tertiary amine groups as part of the cyclic ring structure.

3. The polyamide membrane as claimed in claim 2 wherein said polyfunctional tertiary amine is selected from the group consisting of 1,4-dimethylpiperazine.

4. The polyamide membrane as claimed in claim 1 wherein said polyfunctional amine is selected from the group consisting of aromatic primary amines, alkane primary diamines, cycloaliphatic primary diamines, cycloaliphatic secondary diamines, piperazine, and aromatic secondary amines.

5. The polyamide membrane as claimed in claim 4 wherein said polyfunctional amine is meta-phenylenediamine.

6. The polyamide membrane as claimed in claim 1 wherein said polyfunctional amine is present in said aqueous solution in an amount constituting about 0.1 to 20 wt. % of said aqueous solution.

7. The polyamide membrane as claimed in claim 1 wherein said amine-reactive reactant is selected from the group consisting of an isophthaloyl halide, a terephthaloyl halide, a trimesoyl halide and mixtures thereof.

8. The polyamide membrane as claimed in claim 7 wherein said amine-reactive reactant is trimesoyl chloride.

9. The polyamide membrane as claimed in claim 1 wherein said amine-reactive reactant is present in said organic solvent solution in an amount constituting about 0.01 to 10 wt. % of said organic solvent solution.

10. The polyamide membrane as claimed in claim 1 wherein said polyfunctional tertiary amine salt is present in said aqueous solution in an amount constituting about 0.1 to 12 wt. % of said aqueous solution.

11. The polyamide membrane as claimed in claim 10 wherein said polyfunctional tertiary amine salt is present in said aqueous solution in an amount constituting about 0.1 to 9 wt. % of said aqueous solution.

12. The polyamide membrane as claimed in claim 11 wherein said polyfunctional tertiary amine salt is present in said aqueous solution in an amount constituting about 0.2 to 7 wt. % of said aqueous solution.

13. The polyamide membrane as claimed in claim 1 wherein said acid is selected from the group consisting of an aromatic sulfonic acid, an aliphatic sulfonic acid, a cycloaliphatic sulfonic acid, sulfuric acid, trifluoroacetic acid, nitric acid, hydrochloric acid, phosphoric acid, an alkyl phosphonic acid, an aryl phosphonic acid, a carboxylic acid and mixtures thereof.

14. The polyamide membrane as claimed in claim 1 wherein said aqueous solution further comprises one or more polar solvents.

15. The polyamide membrane as claimed in claim 14 wherein said polyfunctional amine is selected from the group consisting of aromatic primary amines, alkane primary diamines, cycloaliphatic primary diamines, cycloaliphatic secondary diamines, piperazine, and aromatic secondary amines and wherein said polyfunctional tertiary amine is selected from the group consisting of N,N,N',N'-tetramethyl-1,6-hexanediamine; N,N,N',N'-tetramethyl1,4-butanediamine; N,N,N',N'-tetramethyl-2-butene-1,4-diamine; N,N,N',N'-tetramethyl-1,3-butanediamine; N,N,N',N'-tetramethyl-1,3-propanediamine; N,N,N',N'-tetramethyl-1,8-octanediamine; N,N,N',N'-tetramethyl-1,7-heptanediamine; N,N,N',N'-tetramethyl-1,5-pentanediamine; N,N,N',N'-tetraethyl-1,4-butanediamine; N,N,N',N'-tetraethyl-1,3-butanediamine; N,N,N',N'-tetraethyl-1,3-propanediamine; 1,4-dimethylpiperazine; and N,N,N',N'-tetraethylethylenediamine.

16. The polyamide membrane as claimed in claim 14 wherein said one or more polar solvents are selected from the group consisting of ethylene glycol derivatives, 1,3-propanediol derivatives, sulfoxide derivatives, sulfone derivatives, nitrile derivatives, ketone derivatives and urea derivatives.

17. A composite reverse osmosis membrane comprising:
(a) a porous support, and
(b) a polyamide membrane as claimed in claim 1 on said porous support.

18. A polyamide membrane comprising a reaction product of (i) an aqueous solution comprising a polyfunctional amine and a reaction product of a polyfunctional tertiary amine and an acid, said polyfunctional tertiary amine and said acid being reacted together in a molar ratio that is greater than or equal to 1:0, respectively, and is less than 1:1, respectively, wherein said polyfunctional tertiary amine is an alkane having a backbone carbon number ranging from 2 to 10, said polyfunctional tertiary amine having at least two tertiary amine groups as side chains on said carbon backbone or as a part of said backbone; and (ii) an organic solvent solution comprising an amine-reactive reactant selected from the group consisting of a polyfunctional acyl halide, a polyfunctional sulfonyl halide and a polyfunctional isocyanate.

19. A polyamide membrane comprising a reaction product of (i) an aqueous solution comprising a polyfunctional amine and a reaction product of a polyfunctional tertiary amine and an acid, said polyfunctional tertiary amine and said acid being reacted together in a molar ratio that is greater than or equal to 1:0, respectively, and is less than 1:1, respectively, wherein said polyfunctional tertiary amine is an alkane having a backbone carbon number ranging from 2 to 10, said polyfunctional tertiary amine having at least two tertiary amine groups as side chains on said carbon backbone or as a part of said backbone, said polyfunctional tertiary amine being selected from the group consisting of N,N,N',N'-tetramethyl-1,6-hexanediamine; N,N,N',N'-tetramethyl-1,4-butanediamine; N,N,N',N'-tetramethyl-2-butene-1,4-diamine; N,N,N',N'-tetramethyl-1,3-butanediamine; N,N,N',N'-tetramethyl-1,3-propanediamine; N,N,N',N'-tetramethyl-1,8-octanediamine; N,N,N',N'-tetramethyl-1,7-heptanediamine; N,N,N',N'-tetramethyl-1,5-pentanediamine; N,N,N',N'-tetraethyl-1,4-butanediamine; N,N,N',N'-tetraethyl-1,3-butanediamine; N,N,N',N'-tetraethyl-1,3-propanediamine; and N,N,N',N'-tetraethylethylenediamine; and (ii) an organic solvent solution comprising an amine-reactive reactant selected from the group consisting of a polyfunctional acyl halide, a polyfunctional sulfonyl halide and a polyfunctional isocyanate.

20. The polyamide membrane as claimed in claim 19 wherein said polyfunctional tertiary amine is selected from the group consisting of N,N,N',N'-tetramethyl-1,6-hexanediamine; N,N,N',N'-tetramethyl-1,4-butanediamine; N,N,N',N'-tetramethyl-2-butene-1,4-diamine; N,N,N',N'-tetramethyl-1,3-butanediamine; and N,N,N',N'-tetramethyl-1,3-propanediamine.

21. A polyamide membrane comprising a reaction product of (i) an aqueous solution comprising a polyfunctional amine and a reaction product of a polyfunctional tertiary amine and an acid, said polyfunctional tertiary amine and said acid being reacted together in a molar ratio that is greater than or equal to 1:0, respectively, and is less than 1:1, respectively, wherein said polyfunctional tertiary amine is a cyclic hydrocarbon having a ring member ranging from 3 to 10, said polyfunctional tertiary amine having at least two tertiary amine groups as side chains on said ring; and (ii) an organic solvent solution comprising an amine-reactive reactant selected from the group consisting of a polyfunctional acyl halide, a polyfunctional sulfonyl halide and a polyfunctional isocyanate.

22. A polyamide membrane comprising a reaction product of (i) an aqueous solution comprising a polyfunctional amine and a reaction product of a polyfunctional tertiary amine and an acid, said polyfunctional tertiary amine and said acid being reacted together in a molar ratio that is greater than or equal to 1:0, respectively, and is less than 1:1, respectively, wherein said polyfunctional tertiary amine is a cyclic hydrocarbon having a ring member ranging from 3 to 10, said polyfunctional tertiary amine having at least two tertiary amine groups as side chains on said ring, said polyfunctional tertiary amine being N,N,N',N'-tetramethyl,-1,n-cyclohexanediamine wherein n is 2–4; and (ii) an organic solvent solution comprising an amine-reactive reactant selected from the group consisting of a polyfunctional acyl halide, a polyfunctional sulfonyl halide and a polyfunctional isocyanate.

23. A polyamide membrane comprising a reaction product of (i) an aqueous solution comprising a polyfunctional amine and a reaction product of a polyfunctional tertiary amine and an acid, said polyfunctional tertiary amine and said acid being reacted together in a molar ratio that is greater than or equal to 1:0, respectively, and is less than 1:1, respectively, wherein said polyfunctional tertiary amine is a cyclic hydrocarbon having a ring member ranging from 3 to 10, said polyfunctional tertiary amine having at least two tertiary amine groups as side chains on said ring, said polyfunctional tertiary amine being N,N,N',N'-tetramethyl-1,n-cyclohexanebis(methylamine) wherein n is 2–4: and (ii) an organic solvent solution comprising an amine-reactive reactant selected from the group consisting of a polyfunctional acyl halide, a polyfunctional sulfonyl halide and a polyfunctional isocyanate.

24. A polyamide membrane comprising a reaction product of (i) an aqueous solution comprising water, a polyfunctional amine, one or more polar solvents, and a reaction product of a polyfunctional tertiary amine and an acid, said polyfunctional tertiary amine and said acid being reacted together in a molar ratio that is greater than or equal to 1:0. respectively, and is less than 1:1, respectively; and (ii) an organic solvent solution comprising an amine-reactive reactant selected from the group consisting of a polyfunctional acyl halide, a polyfunctional suffonyl halide and a polyfunctional isocyanate.

25. The polyamide membrane as claimed in claim 24 wherein said one or more polar solvents are present in said aqueous solution in an amount constituting about 0.01 to 8 wt. % of said aqueous solution.

26. The polyamide membrane as claimed in claim 25 wherein said one or more polar solvents are selected from the group consisting of an alkoxyethanol in an amount constituting about 0.05 to 4.0 wt. % of said aqueous solution, 1,3-heptanediol in an amount constituting about 0.01 to 1.0 wt. % of said aqueous solution, 2-ethyl-1,3-hexanediol in an amount constituting about 0.01 to 1.0 wt. % of said aqueous solution, butylsulfoxide in an amount constituting about 0.01 to 1.0 wt. % of said aqueous solution, methylphenyl-sulfoxide in an amount constituting about 0.01 to 1.0 wt. % of said aqueous solution, butylsulfone in an amount constituting about 0.01 to 1.0 wt. % of said aqueous solution and a ketone derivative in an amount constituting about 0.01 to 4.0 wt. % of said aqueous solution.

27. The polyamide membrane as claimed in claim 24 wherein said one or more polar solvents are selected from the group consisting of ethylene glycol derivatives, 1,3-propanediol derivatives, sulfoxide derivatives, sulfone derivatives, nitrile derivatives, ketone derivatives and urea derivatives.

28. The polyamide membrane as claimed in claim 27 wherein said ethylene glycol derivatives are selected from the group consisting of 2-methoxyethanol, 2-ethoxyethanol, 2-propoxyethanol, 2-butoxyethanol, t-butylmethyl ether, di(ethylene glycol) di(ethylene glycol) methyl ether, di(ethylene glycol) ethyl ether, (2-methoxyethyl) ether, and (2-ethoxyethyl) ether, wherein said 1,3-propanediol derivatives are selected from the group consisting of 1,3-heptanediol, 2-ethyl-1,3-hexanediol, 1,3-hexanediol and 1,3-pentanediol, wherein said sulfoxide derivatives are selected from the group consisting of dimethyl sulfoxide, tetramethylene sulfoxide, butyl sulfoxide and methylphenyl sulfoxide, wherein said sulfone derivatives are selected from the group consisting of dimethyl sulfone, ethylsulfone and butyl sulfone, wherein said nitrile derivatives are selected from the group consisting of acetonitrile and propionitrile, wherein said ketone derivatives are selected from the group consisting of acetone, 2-butanone, 2-hexanone, 3-hexanone, 2-pentanone, 3-pentanone, cyclohexanone and cyclopentantone, and wherein said urea derivative is 1,3-dimethyl-2-imidazolidinone.

29. A polyamide membrane comprising a reaction product of (i) an aqueous solution comprising water, a polyfunctional amine, and a reaction product of a polyfunctional tertiary amine and an acid, wherein said polyfunctional tertiary amine and said acid are reacted together in a molar ratio that is equal to 1:0, respectively, wherein said polyfunctional tertiary amine is selected from the group consisting of an alkane and a cyclic hydrocarbon, said alkane having a backbone carbon number ranging from 2 to 10 and having at least two tertiary amine groups as side chains on said carbon backbone or as a part of said backbone, said cyclic hydrocarbon having a ring member ranging from 3 to 10 and having at least two tertiary amine groups as side chains on said ring, and wherein said polyfunctional tertiary amine is present in said aqueous solution in an amount constituting about 0.05 to 6 wt. % of said aqueous solution; and (ii) an organic solvent solution comprising an amine-reactive reactant selected from the group consisting of a polyfunctional acyl halide, a polyfunctional sulfonyl halide and a polyfunctional isocyanate.

30. The polyamide membrane as claimed in claim 29 wherein said polyfunctional tertiary amine is present in said aqueous solution in an amount constituting about 0.1 to 3 wt. % of said aqueous solution.

31. The polyamide membrane as claimed in claim 29 wherein said polyfunctional amine and said polyfunctional tertiary amine are present in said aqueous solution in a weight ratio range of about 1.5:1, respectively, to about 10:1, respectively.

32. The polyamide membrane as claimed in claim 29 wherein said aqueous solution further comprises one or more polar solvents.

33. The polyamide membrane as claimed in claim 32 wherein said polyfunctional amine is selected from the group consisting of aromatic primary amines, alkane primary diamines, cycloaliphatic primary diamines, cycloaliphatic secondary diamines, piperazine, and aromatic secondary amines and wherein said polyfunctional tertiary amine is selected from the group consisting of N,N,N',N'-tetramethyl-1,6-hexanediamine; N,N,N',N'-tetramethyl-1,4-butanediamine; N,N,N',N'-tetramethyl-2-butene-1,4-diamine; N,N,N',N'-tetramethyl-1,3-butanediamine; N,N,N',N'-tetramethyl-1,3-propanediamine; N,N,N',N'-tetramethyl-1,8-octanediamine; N,N,N',N'-tetramethyl-1,7-heptanediamine; N,N,N',N'-tetramethyl-1,5-pentanediamine; N,N,N',N'-tetraethyl-1,4-butanediamine; N,N,N',N'-tetraethyl-1,3-butanediamine; N,N,N',N'-tetraethyl-1,3-propanediamine; and N,N,N',N'-tetraethylethylenediamine.

34. The polyamide membrane as claimed in claim 33 wherein said one or more polar solvents are selected from the group consisting of ethylene glycol derivatives, 1,3-propanediol derivatives, sulfoxide derivatives, sulfone derivatives, nitrile derivatives, ketone derivatives and urea derivatives.

35. A polyamide membrane comprising a reaction product of (i) an aqueous solution comprising a polyfunctional amine and a reaction product of a polyfunctional tertiary amine and an acid anhydride, said polyfunctional tertiary amine and said acid anhydride being reacted together in a molar ratio that is greater than 1:0, respectively, and is less than or equal to 1:0.5, respectively; and (ii) an organic solvent solution comprising an amine-reactive reactant selected from the group consisting of a polyfunctional acyl halide, a polyfunctional sulfonyl halide and a polyfunctional isocyanate.

36. The polyamide membrane as claimed in claim 35 wherein said polyfunctional tertiary amine is an alkane having a backbone carbon number ranging from 2 to 10, said polyfunctional tertiary amine having at least two tertiary amine groups as side chains on said backbone or as part of said backbone.

37. The polyamide membrane as claimed in claim 35 wherein said polyfunctional tertiary amine is a cyclic hydrocarbon having a ring member ranging from 3 to 10, said polyfunctional tertiary amine having at least two tertiary amine groups as side chains on said ring.

38. The polyamide membrane as claimed in claim 35 wherein said polyfunctional amine is selected from the group consisting of aromatic primary amines, alkane primary diamines, cycloaliphatic primary diamines, cycloaliphatic secondary diamines, piperazine and aromatic secondary amines.

39. The polyamide membrane as claimed in claim 35 wherein said aqueous solution further comprises one or more polar solvents.

40. The polyamide membrane as claimed in claim 39 wherein said one or more polar solvents are selected from the group consisting of ethylene glycol derivatives, 1,3-propanediol derivatives, sulfoxide derivatives, sulfone derivatives, nitrile derivatives, ketone derivatives and urea derivatives.

41. The polyamide membrane as claimed in claim 35 wherein said acid anhydride is selected from the group consisting of a carboxylic acid anhydride, a sulfonic acid anhydride and mixtures thereof.

42. The polyamide membrane as claimed in claim 41 wherein said carboxylic acid anhydride is selected from the group consisting of acetic anhydride, propionic anhydride, butyric anhydride, hexanoic anhydride, and benzoic anhydride.

43. A composite reverse osmosis membrane comprising:
(a) a porous support; and
(b) a polyamide membrane as claimed in claim 35 on said porous support.

44. A polyamide membrane comprising a reaction product of (i) an aqueous solution comprising a polyfunctional amine and a reaction product of a polyfunctional tertiary amine and an acid anhydride, said polyfunctional tertiary amine and said acid anhydride being reacted together in a molar ratio that is greater than 1:0, respectively, and is less than or equal to 1:0.5, respectively, said polyfunctional tertiary amine being an alkane having a backbone carbon number ranging from 2 to 10, said polyfunctional tertiary amine having at least two tertiary amine groups as side chains on said backbone or as part of said backbone, said polyfunctional tertiary amine being selected from the group consisting of N,N,N',N'-tetramethyl-1,6-hexanediamine; N,N,N',N'-tetramethyl-1,4-butanediamine; N,N,N',N'-tetramethyl-2-butene-1,4-diamine; N,N,N',N'-tetramethyl-1,3-butanediamine; N,N,N',N'-tetramethyl-1,3-propanediamine; N,N,N',N'-tetramethyl-1,8-octanediamine; N,N,N',N'-tetramethyl-1,7-heptanediamine; N,N,N',N'-tetramethyl-1,5-pentanediamine; N,N,N',N'-tetraethyl-1,4-butanediamine; N,N,N',N'-tetraethyl-1,3-butanediamine; N,N,N',N'-tetraethyl-1,3-propanediamine; and N,N,N',N'-tetraethylethylenediamine; and (ii) an organic solvent solution comprising an amine-reactive reactant selected from the group consisting of a polyfunctional acyl halide, a polyfunctional sulfonyl halide and a polyfunctional isocyanate.

45. A polyamide membrane comprising a reaction product of (i) an aqueous solution comprising a polyfunctional amine and a reaction product of a polyfunctional tertiary amine and an acid anhydride, said polyfunctional tertiary amine and said acid anhydride being reacted together in a molar ratio that is greater than 1:0, respectively, and is less than or equal to 1:0.5, respectively, said polyfunctional tertiary amine being a cyclic hydrocarbon having a ring member ranging from 3 to 10, said polyfunctional tertiary amine having at least two tertiary amine groups as side chains on said ring, said polyfunctional tertiary amine is N,N,N',N'-tetramethyl-1,n-cyclohexanediamine wherein n is 2–4; and (ii) an organic solvent solution comprising an amine-reactive reactant selected from the group consisting of a polyfunctional acyl halide, a polyfunctional sulfonyl halide and a polyfunctional isocyanate.

46. A polyamide membrane comprising a reaction product of (i) an aqueous solution comprising a polyfunctional amine and a reaction product of a polyfunctional tertiary amine and an acid anhydride, said polyfunctional tertiary amine and said acid anhydride being reacted together in a molar ratio that is greater than 1:0, respectively, and is less than or equal to 1:0.5, respectively, said polyfunctional tertiary amine being a cyclic hydrocarbon having a ring member ranging from 3 to 10, said polyfunctional tertiary amine having at least two tertiary amine groups as side chains on said ring, said polyfunctional tertiary amine is N,N,N',N'-tetramethyl-1,n-cyclohexanebis(methylamine) wherein n is 2–4; and (ii) an organic solvent solution comprising an amine-reactive reactant selected from the group consisting of a polyfunctional acyl halide, a polyfunctional sulfonyl halide and a polyfunctional isocyanante.

47. A polyamide membrane comprising a reaction product of (i) an aqueous solution comprising a polyfunctional amine and a reaction product of a polyfunctional tertiary amine and an acid anhydride, said polyfunctional tertiary amine and said acid anyhydride being reacted together in a molar ratio that is greater than 1:0, respectively, and is less than or equal to 1:0.5, respectively, said polyfunctional tertiary amine is a cyclic compound having a ring member ranging from 4 to 10, said polyfunctional tertiary amine having at least two tertiary amine groups as part of the cyclic ring structure; and (ii) an organic solvent solution comprising an amine-reactive reactant selected from the group consisting of a polyfunctional acyl halide, a polyfunctional sulfonyl halide and a polyfunctional isocyanate.

48. The polyamide membrane as claimed in claim 47 wherein said polyfunctional tertiary amine is selected from the group consisting of 1,4-dimethylpiperazine.

49. A polyamide membrane comprising a reaction product of (i) an aqueous solution comprising water, a polyfunctional amine, one or more polar solvents, and a reaction product of a tertiary amine and an acid, said tertiary amine being selected from the group consisting of N,N'-dimethylbutylamine, N,N'-dimethylbenzylamine and N,N,N',N'-tetramethylethylenediamine, said tertiary amine and said acid being reacted together in a molar ratio equal to 1:0, respectively; and (ii) an organic solvent solution comprising an amine-reactive reactant selected from the group consisting of a polyfunctional acyl halide, a polyfunctional sulfonyl halide and a polyfunctional isocyanate.

50. The polyamide membrane as claimed in claim 49 wherein said one or more polar solvents are selected from the group consisting of ethylene glycol derivatives, 1,3-propanediol derivatives, sulfoxide derivatives, sulfone derivatives, nitrile derivatives, ketone derivatives and urea derivatives.

51. A method of making a composite reverse osmosis membrane, said method comprising the steps of:
   (a) coating a porous support with an aqueous solution, said aqueous solution comprising a polyfunctional amine and a salt of a polyfunctional tertiary amine, so as to form a liquid layer on said porous support;
   (b) contacting said liquid layer with an organic solvent solution, said organic solvent solution comprising an amine-reactive reactant selected from the group consisting of a polyfunctional acyl halide, a polyfunctional sulfonyl halide and a polyfunctional isocyanate, so as to interfacially condense said amine-reactive reactant with said polyfunctional amine, thereby forming a cross-linked, interfacial polyamide layer on said porous support; and
   (c) drying the product of step (b) at a temperature below 50° C. to form a composite reverse osmosis membrane.

52. The method of claim 51 further comprising the step of rinsing the product of step (c) in a basic aqueous solution.

53. The method of claim 51 wherein said aqueous solution further comprises one or more polar solvents.

54. The method of claim 51 wherein said salt of said polyfunctional tertiary amine is the reaction product of said polyfunctional tertiary amine and a strong acid.

55. The method of claim 54 wherein said polyfunctional tertiary amine has n tertiary amine groups, n being greater than or equal to 2, and wherein said polyfunctional tertiary amine and said acid are reacted together in a molar ratio that is greater than 1:0, respectively, and is less than 1:n, respectively.

56. A composite reverse osmosis membrane prepared according to the method of claim 51.

57. A method of making a composite reverse osmosis membrane, said method comprising the steps of:
   (a) coating a porous support with a first aqueous solution, said first aqueous solution comprising one of a polyfunctional tertiary amine and a salt of said polyfunctional tertiary amine, so as to form a first liquid layer on said porous support;
   (b) coating the first liquid layer with a second aqueous solution, said second aqueous solution comprising a polyfunctional amine, so as to form a second liquid layer over said first liquid layer;
   (c) contacting the twice-coated porous support with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and
   (d) drying the product of step (c) at a temperature below 50° C. to form a composite reverse osmosis membrane.

58. The method as claimed in claim 57 further comprising the step of rinsing the product of step (d) in a basic aqueous solution.

59. The method as claimed in claim 57 wherein said first aqueous solution further comprises one or more polar solvents.

60. A polyamide membrane comprising a reaction product of (i) an aqueous solution comprising water, a polyfunctional amine, one or more polar solvents, and a reaction product of a polyfunctional tertiary amine and an acid, said polyfunctional tertiary amine and said acid being reacted together in a molar ratio equal to 1:0, respectively, said polyfunctional tertiary amine being 1,4-dimethylpiperazine; and (ii) an organic solvent solution comprising an amine-reactive reactant selected from the group consisting of a polyfunctional acyl halide, a polyfunctional sulfonyl halide and a polyfunctional isocyanate.

\* \* \* \* \*